(12) United States Patent
Ogawa et al.

(10) Patent No.: US 6,513,485 B2
(45) Date of Patent: Feb. 4, 2003

(54) FUEL INJECTION CONTROL SYSTEM FOR INTERNAL COMBUSTION ENGINE

(75) Inventors: Ken Ogawa, Saitama-ken (JP); Isao Komoriya, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/816,140

(22) Filed: Mar. 26, 2001

(65) Prior Publication Data

US 2001/0025622 A1 Oct. 4, 2001

(30) Foreign Application Priority Data

Mar. 31, 2000 (JP) ........................................ 2000/098621
Apr. 5, 2000 (JP) ........................................ 2000/103483

(51) Int. Cl.$^7$ ................................................ F02B 57/04
(52) U.S. Cl. .................. 123/295; 123/486; 701/104
(58) Field of Search ........................ 123/295, 305, 123/436, 486, 679, 686, 689, 435; 701/104, 105

(56) References Cited

U.S. PATENT DOCUMENTS 5,222,481 A * 6/1993 Morikawa .................... 123/435
6,116,228 A * 9/2000 Motose et al. ............... 123/305
6,298,830 B1 * 10/2001 Kono ......................... 123/478

* cited by examiner

Primary Examiner—Willis R. Wolfe
Assistant Examiner—Mahmoud Gimie
(74) Attorney, Agent, or Firm—Arent Fox Kintner Plotkin & Kahn, PLLC

(57) ABSTRACT

There is disclosed a fuel injection control system for an in-cylinder fuel injection internal combustion engine, which is capable of properly determining a fuel injection time period such that the fuel injection time period reflects a fuel pressure and a deposition of fuel, thereby controlling the amount of fuel to be actually injected. Operating conditions of the engine are detected, and a required fuel amount is determined based on the detected operating conditions. At the same time, a deposited-fuel amount, i.e. an amount of fuel deposited in a combustion chamber, is determined based on the detected operating conditions, and the required fuel amount is corrected according to the determined deposited-fuel amount. Further, a fuel pressure of fuel to be injected into the cylinder is detected, and the fuel injection time period is determined by correcting the corrected required fuel amount according to the detected fuel pressure.

5 Claims, 11 Drawing Sheets

FUEL INJECTION CONTROL SYSTEM FOR INTERNAL COMBUSTION ENGINE

BACKGROUND OF THE INVENTION

1. Field of the Invention

This invention relates to a fuel injection control system for an internal combustion engine of an in-cylinder fuel injection type in which fuel is directly injected into a combustion chamber within each cylinder, the fuel injection control system controlling a fuel injection time period to thereby control the amount of fuel injected into the cylinder.

2. Description of the Prior Art

Conventionally, a fuel injection control system of the above-mentioned kind was proposed e.g. by Japanese Laid-Open Patent Publication (Kokai) No. 7-166922. In the proposed fuel injection control system, fuel behavior parameters indicative of behaviors of fuel injected into a combustion chamber and a fuel injection amount Fi are determined in the following manner: A combustion-chamber fuel deposition ratio ac is retrieved from a map according to the engine temperature TE and the engine rotational speed NE. Further, a cylinder fuel deposition ratio ad is determined based the engine temperature TE and the engine coolant temperature TW, and a gaseous fuel ratio $\beta c$ is calculated from the combustion-chamber fuel deposition ratio ac and the cylinder fuel deposition ratio ad.

Then, a fuel evaporation ratio $\gamma c$ is retrieved from a map according to the engine temperature TE and the engine rotational speed NE, and an exhaust carry-off ratio $\gamma e$ is calculated from the fuel evaporation ratio $\gamma c$. Further, a gaseous fuel residual ratio $\beta k$ is retrieved from a map according to the engine temperature TE and the engine rotational speed NE. Then, the present value of a combustion-chamber gaseous fuel amount Fc is calculated from the engine rotational speed NE and an intake air amount Q. The fuel injection amount Fi is calculated from the present value of the combustion-chamber gaseous fuel amount Fc, the aforementioned fuel behavior parameters, and the immediately preceding value of a combustion-chamber deposited-fuel amount Mc. The present value of the combustion-chamber deposited-fuel amount Mc is also calculated from the fuel behavior parameters, the immediately preceding value of the combustion-chamber deposited-fuel amount Mc, and the fuel injection amount Fi. Further, a fuel injection time period Tout is calculated from the fuel injection amount Fi.

On the other hand, an in-cylinder fuel injection engine is known in which when the engine is operating under a very low load, such as idling, fuel is injected during a compression stroke to cause a mixture having a far leaner air-fuel ratio than the stoichiometric air-fuel ratio to be distributed in a combustion chamber and burned by stratified combustion. In this kind of engine, since fuel injection is carried out during the compression stroke, fuel is supplied via a fuel injection valve in a state pressurized by a fuel pump to a level much higher than when fuel injection is carried out during an intake stroke. Further, the pressure of fuel within the fuel injection valve has a characteristic that it drops temporarily immediately after fuel injection via the fuel injection valve and then returns to a predetermined level, and hence the actual fuel pressure tends to change largely. Further, the actual fuel pressure also tends to change largely according to changes in the discharge pressure of the fuel pump.

In the above conventional fuel injection control systems, the fuel injection time period Tout, the fuel behavior parameters, and the combustion-chamber gaseous fuel amount Fc, and the combustion-chamber deposited-fuel amount Mc are calculated by using the engine temperature TE, the engine rotational speed NE, the engine coolant temperature TW, and the intake air amount Q as parameters. However, even if the fuel injection time period Tout is held constant, due to changes in fuel pressure, the amount of fuel actually injected into each cylinder deviates from a desired amount. Particularly in the case of the above in-cylinder fuel injection engine in which stratified combustion is performed, fuel pressure changes largely, so that the deviation (error) of the actual fuel injection amount from the desired amount tends to be increased. Fuel pressure is closely related to fuel deposition in a combustion chamber, and hence a parameter, such as the combustion-chamber deposited-fuel amount Mc, varies with the fuel pressure. However, the conventional fuel injection control systems is incapable of calculating the combustion-chamber deposited-fuel amount Mc such that the combustion-chamber deposited-fuel amount Mc reflects the fuel pressure, and hence incapable of properly calculating the combustion-chamber deposited-fuel amount Mc and the fuel injection amount Fi. Particularly in the case of the in-cylinder fuel injection engine in which stratified combustion is performed, fuel pressure undergoes large changes, and hence an error in calculation of the fuel injection amount Fi tends to be increased. For these reasons, e.g. in the execution of feedback control of the air-fuel ratio, the fuel injection amount cannot be properly calculated according to a desired air-fuel ratio, which degrades convergence of the air-fuel ratio control.

SUMMARY OF THE INVENTION

It is an object of the invention to provide a fuel injection control system for an internal combustion engine of an in-cylinder fuel injection type, which is capable of properly determining a fuel injection time period such that the fuel injection time period reflects a fuel pressure and a deposition of fuel, thereby accurately controlling the amount of fuel actually injected.

To attain the above object, the present invention provides a fuel injection control system for an internal combustion engine of an in-cylinder fuel injection type in which fuel is directly injected into a combustion chamber within a cylinder, the fuel injection control system controlling a fuel injection time period to thereby control an amount of fuel to be injected into the cylinder.

The fuel injection control system according to the invention is characterized by comprising:

operating condition-detecting means for detecting operating conditions of the engine;

required fuel amount-determining means for determining a required fuel amount based the detected operating conditions;

deposited-fuel amount-determining means for determining a deposited-fuel amount of fuel which is deposited within the combustion chamber, based the detected operating conditions;

required fuel amount-correcting means for correcting the required fuel amount according to the determined deposited-fuel amount;

fuel pressure-detecting means for detecting a fuel pressure of fuel to be injected into the cylinder; and fuel injection time period-determining means for determining the fuel injection time period as a time period equivalent to a value obtained by correcting the corrected required fuel amount according to the detected fuel pressure.

According to this fuel injection control system, the required fuel amount and the deposited-fuel amount are each determined based on operating conditions of the engine, and the required fuel amount is corrected according to the deposited-fuel amount. Then, the corrected required fuel amount is further corrected according to the fuel pressure, thereby determine the fuel injection time period. Since the fuel injection time period is thus determined by correcting the required fuel amount corrected according to the deposited-fuel amount, according to the fuel pressure, it is possible to properly determine the fuel injection time period such that the fuel injection time period reflects the fuel pressure and the deposited fuel. This makes it possible to accurately control the amount of fuel actually injected into the cylinder. As a result, e.g. in the execution of feedback control of the air-fuel ratio, convergence of the feedback control can be enhanced to thereby improve exhaust emission characteristics.

Preferably, the fuel injection control system further includes fuel behavior parameter-calculating means for calculating fuel behavior parameters indicative of behaviors of fuel injected into the cylinder, based on the detected operating conditions, and fuel behavior parameter-correcting means for correcting the fuel behavior parameters according to the detected fuel pressure, the deposited-fuel amount-determining means determining the deposited-fuel amount based on the fuel behavior parameters corrected by the fuel behavior parameter-correcting means.

According to this preferred embodiment, the fuel behavior parameters are calculated based on the operating conditions of the engine, and then corrected according to the fuel pressure. Further, the deposited-fuel amount in the combustion chamber is determined according to the corrected fuel behavior parameters, and then the fuel injection amount is determined according to the corrected deposited-fuel amount. The fuel pressure and the deposition of fuel in the combustion chamber are closely related to each other, and the deposited-fuel amount varies with the fuel pressure. Therefore, by using the fuel behavior parameters corrected according to the fuel pressure, it is possible to properly determine the deposited-fuel amount such that the deposited-fuel amount reflects the fuel pressure, and thereby properly determine the fuel injection amount. As a result, e.g. in the execution of feedback control of the air-fuel ratio, convergence of the feedback control can be enhanced, which makes it possible to improve exhaust emission characteristics.

Preferably, at least one of an intake valve and an exhaust valve of the internal combustion engine can be selectively switched to any one of a plurality of valve timings, and the fuel behavior parameter-correcting means corrects the fuel behavior parameters according to the selected valve timing.

According to this preferred embodiment, since the fuel behavior parameters are corrected according to a selected valve timing, it is possible to determine the fuel injection amount properly in response to changes in the amount of intake air, the timing of fuel injection, etc. caused by the switching of the valve timing.

More preferably, the operating condition-detecting means includes crank angle position-detecting means for detecting a crank angle position of the cylinder, and the fuel injection amount-determining means includes differential pressure-calculating means for calculating a differential pressure between the detected fuel pressure and a pressure within the cylinder which is estimated from the detected crank angle position of the cylinder, the value being obtained by correcting the corrected required fuel amount according to the differential pressure.

More preferably, the parameters indicative of behaviors of fuel are a ratio of an amount of part of injected fuel which is injected in the present combustion cycle, the part of the injected fuel being actually burned in the present combustion cycle, to an amount of the injected fuel, and a ratio of an amount of part of deposited fuel which was left deposited on inner walls of a combustion chamber defined within the cylinder at an end of the immediately preceding combustion cycle, the part of the deposited fuel being actually burned in the present combustion cycle, to an amount of the deposited fuel.

The above and other objects, features, and advantages of the invention will become more apparent from the following detailed description taken in conjunction with the accompanying drawings.

DETAILED DESCRIPTION OF THE PREFERRED EMBODIMENT

Figure 1:
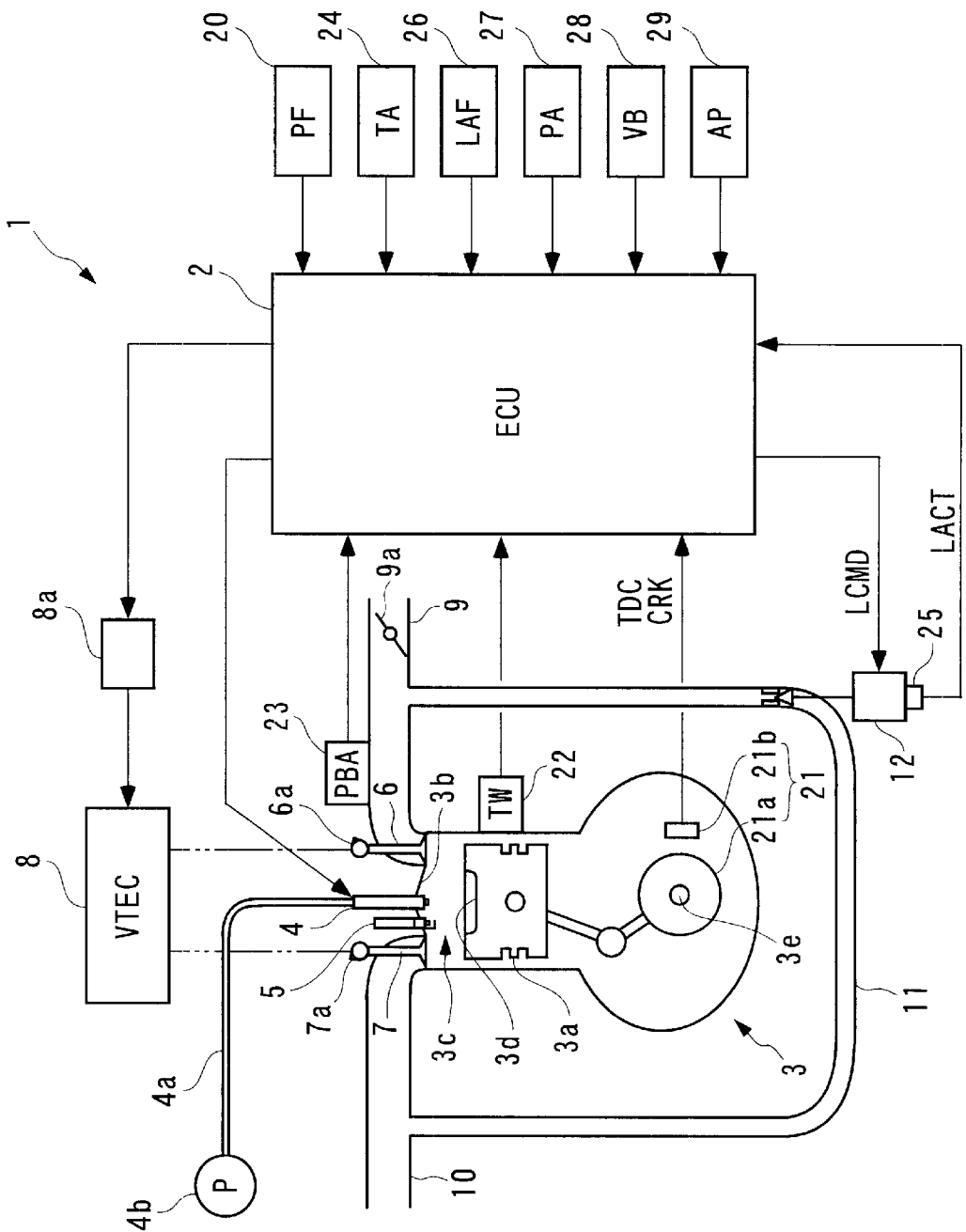
FIG. 1 is a block diagram schematically showing the arrangement of an internal combustion engine incorporating a fuel injection control system according to an embodiment of the invention.

The invention will now be described in detail with reference to the drawings showing an embodiment thereof. Referring first to FIG. 1, there is schematically shown the arrangement of a fuel injection control system for an internal combustion engine, according to an embodiment of the invention. As shown in the figure, the fuel injection control system 1 includes an ECU 2 (operating condition-detecting means, required fuel amount-determining means, parameter-calculating means, deposited fuel amount-determining means, required fuel amount-correcting means, fuel pressure-detecting means, fuel injection time period-determining means, fuel behavior parameter-calculating means, fuel behavior parameter-correcting means, differential pressure-calculating means). The ECU 2 carries out fuel injection control and ignition timing control of the internal combustion engine 3 (hereinafter simply referred to as "the engine 3").

The engine 3 is a straight type four-cylinder gasoline engine. The engine 3 has four cylinders (only one of the cylinders is shown in the figure) in each of which a combustion chamber 3c is formed between the piston 3a and a cylinder head 3b. The piston 3a has a top surface thereof formed with a recess 3d in the center thereof. The cylinder head 3b has a fuel injection valve 4 (hereinafter simply referred to as "the injector 4") and a spark plug 5 mounted therein such that they face the combustion chamber 3c. The engine 3 is a so-called in-cylinder fuel injection type in which fuel is directly injected into the combustion chamber 3c.

The injector 4 is arranged in a central portion of a top wall of the combustion chamber 3c and connected to a high-pressure pump 4b via a fuel pipe 4a. Fuel is pressurized by the high-pressure pump to a high pressure, and then supplied to the injector 4 in a state of the pressure thereof being regulated by a regulator, not shown. The fuel is injected from the injector 4 toward the recess 3d of the piston 3a, and hits the top surface of the piston 3a including the recess 3d to form fuel jets. Particularly, in a stratified combustion mode, referred to hereinafter, most of the fuel injected by the injector 4 hits the recess 3d to form fuel jets.

A fuel pressure sensor 20 is mounted in a portion of the fuel pipe 4a at a location in the vicinity of the injector 4. The fuel pressure sensor (fuel pressure-detecting means) 20 detects a fuel pressure PF of the fuel injected by the injector 4 and delivers a signal indicative of the sensed fuel pressure to the ECU 2. Further, the injector 4 is electrically connected to the ECU 2, and a final fuel injection time period Tout (i.e. fuel injection amount) over which the injector 4 is open and a fuel injection timing inj (i.e. a valve-opening timing and a valve-closing timing) of the same are controlled by a drive signal delivered from the ECU 2, as described in detail hereinafter.

The spark plug 5 is also connected to the ECU 2, and a high voltage is applied to the spark plug 5 at an ignition timing θig indicated by a drive signal delivered from the ECU 2, for electric discharge, whereby an air-fuel mixture is burned in the combustion chamber 3c.

An intake cam 6a for opening and closing an intake valve 6 of each cylinder and an exhaust cam 7a for opening and closing an exhaust valve 7 of the same are each comprised of a low-speed cam and a high-speed cam having a higher cam nose than that of the low-speed cam. Further, the engine 3 is provided with a valve timing changeover mechanism 8 (hereinafter referred to as "the VTEC 8") and an oil pressure control valve 8a for controlling supply and stop of supply of an oil pressure to the VTEC 8.

The VTEC 8 switches the intake cam 6a (or the exhaust cam 7a) of each cylinder between the low-speed cam and the high-speed cam, to thereby change the valve timing of the intake valve 6 (or the exhaust valve 7) during its operation between a low-speed valve timing (hereinafter referred to as "LO.VT") and a high-speed valve timing (hereinafter referred to as "HI.VT"). The VTEC 8 switches the valve timing to HI.VT when oil pressure is supplied to the VTEC 8 via the oil pressure control valve 8a by the control of the ECU 2, and switches the same to LO.VT when the supply of the oil pressure is stopped.

Further, the valve timing is set to LO.VT in a lean combustion mode included in a homogeneous combustion mode or the stratified combustion mode, all described in detail hereinafter, whereas it is set to HI.VT in a stoichiometric combustion mode or a rich combustion mode included in the homogeneous combustion mode, also described in detail hereinafter. When the valve timing is switched to HI.VT, the intake valve 6 (or the exhaust valve 7) is opened and closed at an earlier timing than when the valve timing is held at LO.VT, and the amount of valve lift is also increased.

The engine 3 has a crankshaft 3e to which is mounted a magnet rotor 21a which constitutes a crank angle position sensor 21 together with an MRE (magnetic resistance element) pickup 21b. The crank angle position sensor 21 (operating condition-detecting means) delivers to the ECU 2 a CRK signal and a TDC signal, which are both pulse signals, in accordance with rotation of the crankshaft 3e.

Each pulse of the CRK signal (CRK signal pulse) is generated whenever the crankshaft rotates through a predetermined angle (e.g. 30 degrees). The ECU 2 determines a rotational speed NE (hereinafter referred to as "the engine rotational speed NE") of the engine 3, based on the CRK signal. The TDC signal (TDC signal pulse) is indicative of a predetermined crank angle position of each cylinder in the vicinity of a top dead center (TDC) position at the start of an intake stroke of the piston 3a in the cylinder, and each pulse of the TDC signal is generated whenever the crankshaft rotates through 180 degrees in the case of the four-cylinder engine 3 according to the embodiment. Further, the engine 3 is provided with a cylinder-discriminating sensor, not shown. The cylinder-discriminating sensor generates a cylinder-discriminating signal which is a pulse signal for discriminating each cylinder from the other ones to deliver the signal to the ECU 2. The ECU 2 determines which of the strokes and which crank angle position in the determined stroke each cylinder is in, based on the cylinder-discriminating signal, the CRK signal, and the TDC signal.

An engine coolant temperature sensor 22 (operating condition-detecting means) formed of a thermistor is mounted in the cylinder block of the engine 3. The engine coolant temperature sensor 22 senses an engine coolant temperature TW (parameter indicative of an operating condition of the engine) which is a temperature of an engine coolant circulating within the cylinder block of the engine 3 and supplies an electric signal indicative of the sensed engine coolant temperature to the ECU 2.

At a location downstream of a throttle valve 9a arranged in an intermediate portion of an intake pipe 9 of the engine 3, there is arranged an intake pipe absolute pressure sensor (operating condition-detecting means) 23 in a manner inserted into the intake pipe 9. The intake pipe absolute pressure sensor 23 formed e.g. by a semiconductor pressure sensor senses an intake pipe absolute pressure PBA (parameter indicative of an operating condition of the engine) within the intake pipe 5, and delivers a signal indicative of the sensed absolute pressure PBA to the ECU 2. Further, an intake air temperature sensor 24 is inserted into the intake pipe 9 at a location downstream of the intake pipe absolute pressure sensor 23. The intake air temperature sensor (operating condition-detecting means) 24 formed of a thermistor senses an intake air temperature TA (parameter indicative of an operating condition of the engine) within the intake pipe 9 and delivers a signal indicative of the sensed temperature TA to the ECU 2.

Further, the engine 3 has an EGR pipe 11 connecting between the intake pipe 9 and an exhaust pipe 10. Exhaust gases emitted from the engine 3 are recirculated toward an intake side of the engine 3 through the EGR pipe 11 to lower a combustion temperature within the combustion chamber 3c, whereby EGR operation is carried out to reduce NOx contained in the exhaust gases. The EGR pipe 11 has one end thereof connected to the intake pipe 9 at a location downstream of the throttle valve 9a and the other end thereof connected to the exhaust pipe 10 at a location upstream of a catalyst device, not shown.

The EGR pipe 11 has an EGR control valve 12 mounted therein. The EGR control valve 12 is formed by a linear solenoid valve. The amount of valve lift of the EGR control valve 12 is changed linearly in response to a drive signal from the ECU 2, whereby the EGR pipe 11 is controlled to be opened and closed. The EGR control valve 12 is provided with a valve lift sensor 25 that senses an actual valve lift amount LACT of the EGR control valve 12 to deliver a signal indicative of the sensed valve lift amount to the ECU 2.

The ECU 2 calculates a desired valve lift amount LCMD of the EGR control valve 12 in response to the operating conditions of the engine 3 and controls the EGR control valve 12 such that the actual valve lift amount LACT becomes equal to the desired valve lift amount LCMD, to thereby control an EGR rate.

A LAF sensor 26 is arranged at a location upstream of the catalyst device. The LAF sensor 26 is comprised of zirconia, platinum electrodes, and the like, and linearly detects the concentration of oxygen in exhaust gases in a broad air-fuel ratio range from a rich region to a lean region, to deliver a signal proportional to the sensed concentration of oxygen to the ECU 2.

Further, the engine 3 has an atmospheric pressure sensor (operating condition-detecting means) 27 mounted thereto. The atmospheric pressure sensor 27 formed e.g. by a semiconductor pressure sensor senses an atmospheric pressure PA (parameter indicative of an operating condition of the engine 3), and delivers a signal indicative of the sensed atmospheric pressure PA to the ECU 2. Further, the ECU 2 has a battery sensor 28 connected thereto. The battery sensor 28 detects a voltage VB of a battery, not shown, for supplying a drive voltage to the injectors 4, and delivers a signal indicative of the sensed voltage VB to the ECU 2. An accelerator pedal sensor 29 is mounted in an automotive vehicle on which the engine 3 is installed. The accelerator pedal sensor 29 (operating condition-detecting means) detects an operation amount or stepping amount AP of an accelerator pedal, not shown, (hereinafter referred to as "the accelerator pedal opening AP") and delivers a signal indicative of the sensed accelerator pedal opening AP to the ECU 2.

The ECU 2 is formed by a microcomputer including a CPU, a RAM, a ROM, and an I/O interface, none of which are shown. The signals input from the sensors 20 to 29 to the ECU 2 are each delivered to the I/O interface for A/D conversion and waveform shaping, and then input into the CPU. The CPU carries out various kinds of arithmetic operations based on control programs read from the ROM, and various flags and calculation values, referred to hereinafter, read from and stored in the RAM.

More specifically, the ECU 2 executes a fuel injection control process including an air-fuel ratio control process to thereby control the final fuel injection time period Tout and the fuel injection timing θinj, as described in detail hereinafter. Further, the ECU 2 performs control of the ignition timing θig of the spark plug 5 in addition to the fuel injection control to thereby switch the combustion mode to the stratified combustion mode for an extremely low-load operation of the engine 3, such as idling, and to the homogeneous combustion mode for the other operations of the engine 3 than the extremely low-load operation.

In the stratified combustion mode, fuel is injected into the combustion chamber 3c through the injector 5 at a fuel injection timing θinj, which is determined as described hereinafter, during a compression stroke to cause an air-fuel mixture which is extremely leaner than the stoichiometric air-fuel ratio (e.g. 27 to 60) to be unevenly distributed in the combustion chamber or concentrated in the vicinity of the spark plug 5, and the mixture is burned by stratified combustion. On the other hand, in the homogeneous combustion mode, fuel is injected into the combustion chamber 3c through the injector 4 at a fuel injection timing θinj, which is determined as described hereinafter, during an intake stroke such that a richer air-fuel mixture (having an air-fuel ratio of e.g. 12 to 27) is homogeneously distributed in the combustion chamber 3c than the mixture in the stratified combustion mode, whereby the mixture is burned by homogeneous combustion.

Figure 2:
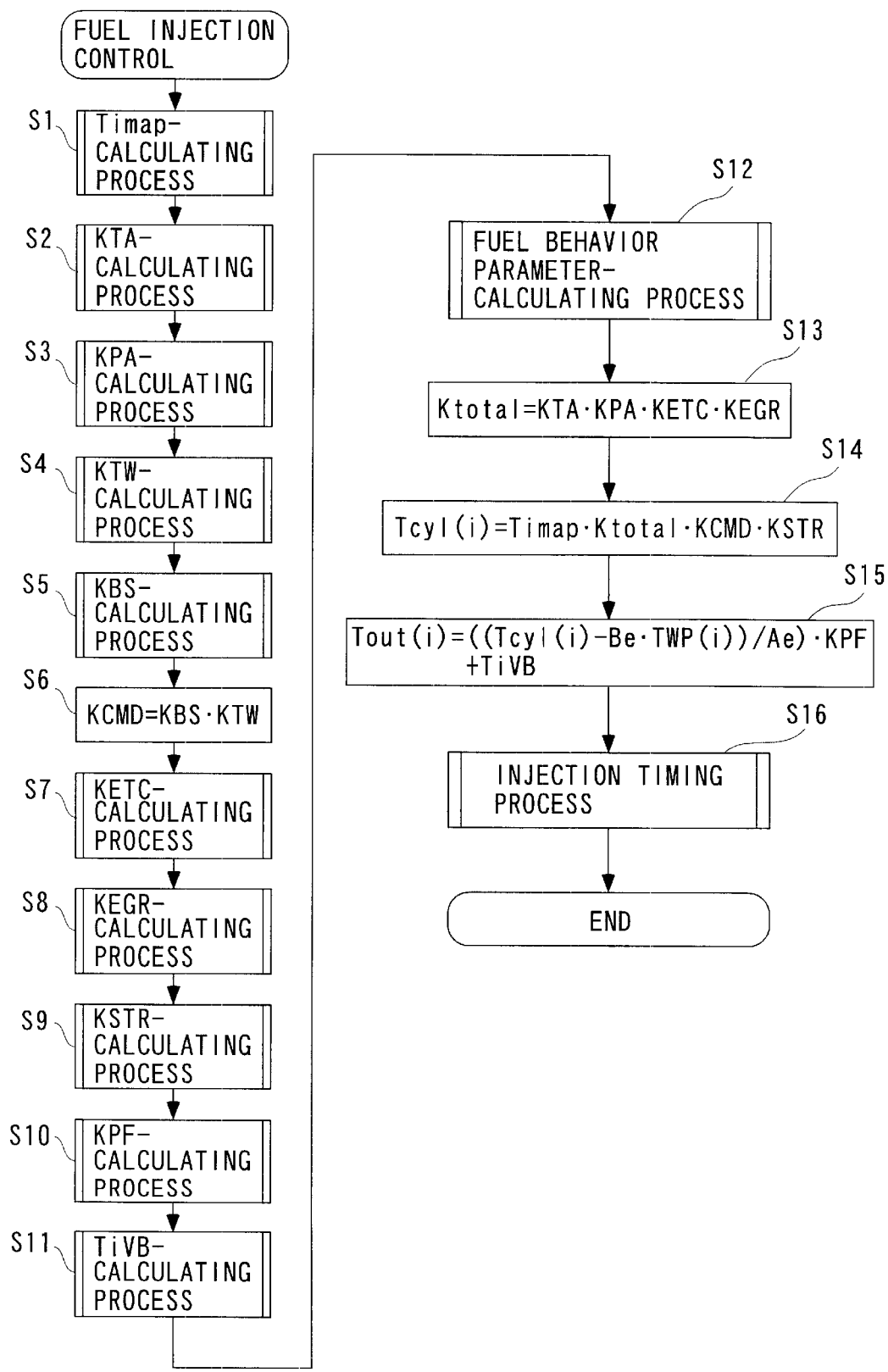
FIG. 2 is a flowchart showing a main routine of a fuel injection control process carried out by the FIG. 1 fuel injection control system.

In the following, the fuel injection control process including the air-fuel ratio control process, which is executed by the ECU 2, will be described in detail with reference to FIGS. 2 to 16. FIG. 2 shows a main routine for carrying out the control process, which is executed by an interrupt handling routine in synchronism with input of each TDC signal pulse. As described hereinafter, in the fuel injection control process, various correction coefficients are calculated (steps S2 to S13), and then the required fuel injection time period TCYL, the final fuel injection time period Tout, and the fuel injection timing θinj are calculated by using these correction coefficients (steps S14 to S16).

First, at a step S1, a Timap-calculating process is executed. In this process, a basic fuel injection time period Timap is calculated by retrieval from a three-dimensional map (hereinafter simply referred to as "the map") according to the engine rotational speed NE and the intake pipe absolute pressure PBA.

Then, the program proceeds to a step S2, wherein a KTA-calculating process is executed. In this process, an intake air-dependent correction coefficient KTA is calculated by retrieval from a table, not shown, according to the intake air temperature TA.

Then, the program proceeds to a step S3, wherein a KPA-calculating process is executed. In the process, an atmospheric pressure-dependent correction coefficient KPA is calculated by retrieval from a table, not shown, according to the atmospheric pressure PA.

Then, the program proceeds to a step S4, wherein a KTW-calculating process is executed. In this process, a coolant temperature-dependent correction coefficient KTW is calculated by retrieval from a map, not shown, according to the engine coolant temperature TW and the intake pipe absolute pressure PBA.

Then, the program proceeds to a step S5, wherein a KBS-calculating process is executed. In this process, first, a required torque PME is calculated by retrieval from a map, not shown, according to the engine rotational speed NE and the accelerator-pedal opening AP. Subsequently, a basic desired air-fuel ratio coefficient KBS is calculated by retrieval from a map, not shown, according to the engine rotational speed NE and the required torque PME.

Then, the program proceeds to a step S6, wherein the basic desired air-fuel ratio coefficient KBS obtained at the step S5 is multiplied by the coolant temperature-dependent correction coefficient KTW obtained at the step S4, to thereby calculate a final desired air-fuel ratio coefficient KCMD. In other words, the final desired air-fuel ratio coefficient KCMD is calculated by correcting the basic desired air-fuel ratio coefficient KBS in accordance with the engine coolant temperature TW and the intake pipe absolute pressure PBA. The basic desired air-fuel ratio coefficient KBS and the final desired air-fuel ratio coefficient KCMD are each expressed as an equivalent ratio proportional to the reciprocal of the air-fuel ratio A/F.

Then, the program proceeds to a step S7, wherein a KETC-calculating process is executed. In this process, a charging efficiency-dependent correction coefficient KETC is calculated by retrieval from a table, not shown, according to the final desired air-fuel ratio coefficient KCMD obtained at the step S6. The charging efficiency-dependent correction coefficient KETC compensates for changes in charging efficiency due to changes in the air-fuel ratio A/F.

Next, the program proceeds to a step S8, wherein a KEGR-calculating process is executed. In this process, first, a basic EGR-dependent correction coefficient KEGRm is calculated by retrieval from a map, not shown, according to the required torque PME obtained at the step S5 and the engine rotational speed NE. Then, a lift amount-dependent correction coefficient KEG1 is calculated based on the desired valve lift amount LCMD of the EGR control valve 12 and the actual valve lift amount LACT detected by the valve lift sensor 25.

Further, an intake pipe absolute pressure-dependent correction coefficient KEGRp is calculated based on the intake pipe absolute pressure PBA and a map value PBAm of the intake pipe absolute pressure. Then, the basic EGR-dependent correction coefficient KEGRm is multiplied by the lift amount-dependent correction coefficient KEG1 and the intake pipe absolute pressure-dependent correction coefficient KEGRp to obtain the EGR-dependent correction coefficient KEGR (KEGR=KEGRm·KEG1·KEGRP). The EGR-dependent correction coefficient KEGR obtained as above compensates for changes in the amount of intake air caused by changes in the EGR rate.

Then, the program proceeds to a step 9, wherein a KSTR-calculating process is executed. In this process, a feedback correction coefficient KSTR is calculated by an adaptive controller of self-turning regulator type, not shown, based on the signal from the LAF sensor 26. The feedback correction coefficient KSTR is applied to the basic fuel injection time period Timap for dynamically compensating for a delay occurring due to a delay in the response of a fuel injection system when an actual air-fuel ratio becomes equal to a desired air-fuel ratio, to thereby improve convergence of the air-fuel feedback control.

Figure 3:
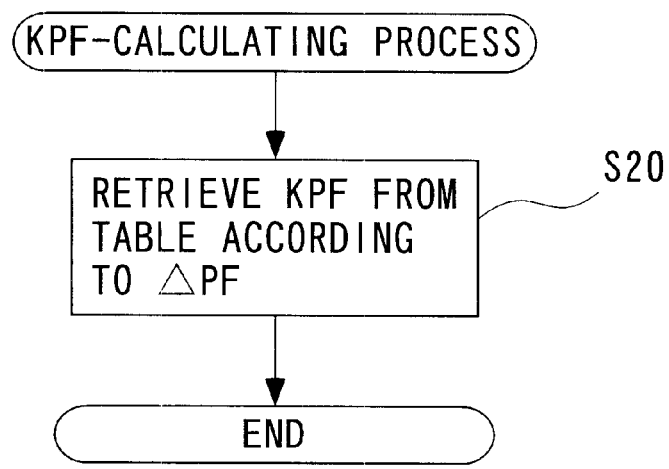
FIG. 3 is a flowchart showing a subroutine for carrying out a KPF-calculating process which is executed at a step S10 in FIG. 2.
Figure 4:
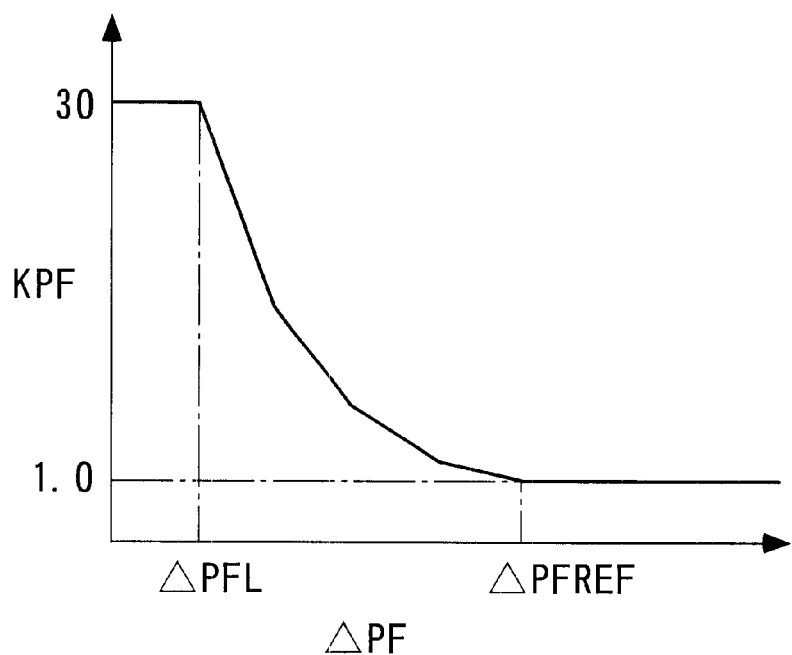
FIG. 4 shows an example of a ΔPF-KPF table for use in the FIG. 3 KPF-calculating process.

Then, the program proceeds to a step S10, wherein a KPF-calculating process is executed. In this process, as shown in FIG. 3, at a step S20, a fuel pressure-dependent correction coefficient KPF is calculated by retrieval from a $\Delta$PF-KPF table an example of which is shown in FIG. 4 according to a differential pressure $\Delta$PF (=PF−PCYL) which is a difference between the fuel pressure PF and a cylinder pressure (pressure within the cylinder) PCYL, followed by terminating the program. In this case, the cylinder pressure PCYL is estimated by retrieval from a table, not shown, according to the crank angle position of a corresponding cylinder. It should be noted that the method of calculating the cylinder pressure PCYL is not limited to this, but a cylinder pressure sensor for detecting the cylinder pressure PCYL may be mounted to the engine 3.

In the $\Delta$PF-KPF table, the fuel pressure-dependent correction coefficient KPF is set to a value of 30 in a range where the differential pressure $\Delta$PF is equal to or lower than a first predetermined value $\Delta$PFL (e.g. 0.03 MPa), and to a value of 1.0 in a range where the differential pressure $\Delta$PF is equal to or higher than a second predetermined value $\Delta$PFREF (e.g. 10 MPa) higher than the first predetermined value $\Delta$PFL. Further, when the differential pressure $\Delta$PF is in a range between $\Delta$PFL and $\Delta$PFREF ($\Delta$PFL<$\Delta$PF<$\Delta$PFREF), the fuel pressure-dependent correction coefficient KPF is set such that it becomes smaller as the differential pressure $\Delta$PF is higher. The reason why the fuel pressure-dependent correction coefficient KPF is thus set within the range between $\Delta$PFL and $\Delta$PFREF ($\Delta$PFL<$\Delta$PF<$\Delta$PFREF) is that when the injector 4 is opened over the final fuel injection time period Tout, described in detail hereinafter, it is required to compensate for changes occurring in the amount of actual injection of fuel caused by variation in the differential pressure $\Delta$PF even if the final fuel injection time period Tout is set to an identical value (e.g. even if the final fuel injection time period Tout is set to an identical value, the amount of fuel actually injected increases as the differential pressure $\Delta$PF becomes larger).

Further, the reason why the fuel pressure-dependent correction coefficient KPF is set as above in the range of $\Delta$PFL$\leq$$\Delta$PFREF is that when the differential pressure $\Delta$PF is equal to or lower than the value $\Delta$PFL in the stratified combustion mode, the amount of fuel actually injected does not change as long as the final fuel injection time period Tout is not changed. On the other hand, the reason why the fuel pressure-dependent correction coefficient KPF is set as above in the range of $\Delta$PFL$\geq$$\Delta$PFREF is that when the differential pressure $\Delta$PF is equal to or higher than the value $\Delta$PFREF in the homogeneous combustion mode, the amount of fuel corresponding to the desired air-fuel ratio is reliably injected when the injector 4 is opened over the final fuel injection time period Tout. It should be noted that in the in-cylinder fuel injection engine 3, the fuel pressure PF is much higher than the cylinder pressure PCYL (e.g. the fuel pressure PF is one hundred times as high as the cylinder pressure PCYL), so that the fuel pressure PF may be used in place of the differential pressure $\Delta$PF, as a parameter for use in calculating the fuel pressure-dependent correction coefficient KPF.

After the KPF-calculating process is executed as above, the program proceeds to a step S11 in FIG. 2, wherein a TiVB-calculating process is executed. In this process, an ineffective time-dependent correction term TiVB is calculated by retrieval from a table, not shown, according to the voltage value VB of the battery. The ineffective time-dependent correction term TiVB compensates for a delay time (ineffective time) until the injector 4 is actually opened for fuel injection.

Then, the program proceeds to a step S12, wherein a fuel behavior parameter-calculating process is executed. In this process, described in detail hereinafter, a direct ratio Ae and a take-off ratio Be are calculated as parameters indicative of behaviors of fuel.

Then, the program proceeds to a step S13, wherein the intake air-dependent correction coefficient KTA, the atmospheric pressure-dependent correction coefficient KPA, the charging efficiency-dependent correction coefficient KETC, and the EGR-dependent correction coefficient KEGR are multiplied by each other to calculate a total correction coefficient Ktotal.

Then, the program proceeds to a step S14, wherein the basic fuel injection time period Timap is multiplied by the total correction coefficient Ktotal, the final desired air-fuel ratio coefficient KCMD, and the feedback correction coefficient KSTR to calculate a required fuel injection time period Tcyl(i) on a cylinder-by-cylinder basis. The required fuel injection time period Tcyl(i) corresponds to the amount of fuel required for each cylinder depending on the operating condition of the engine 3. The symbol (i) of the required fuel injection time period Tcyl(i) represents a cylinder number.

Then, the program proceeds to a step S15, wherein a final fuel injection time period Tout(i) which represents a valve-opening time period of the injector 4 of each cylinder, i.e. the amount of fuel to be actually injected into each cylinder is calculated by the use of the following equation (1):

$$Tout(i)=((Tcyl(i)-Be \cdot TWP(i))/Ae)KPF+TiVB \qquad (1)$$

wherein TWP(i) represents a deposited-fuel amount-equivalent value (time period) equivalent to the amount of fuel deposited in each cylinder, and it is obtained as described hereinafter.

As is apparent from the steps S14, S15, the required fuel injection time period Tcyl(i) determining a required fuel amount depending on the operating conditions of the engine 3 is calculated without using the fuel pressure-dependent correction coefficient KPF. The required fuel injection time period Tcyl(i) by nature is irrelevant to the fuel pressure PF, so that the required fuel injection time period Tcyl(i) can be properly calculated without using the fuel pressure-dependent correction coefficient KPF. On the other hand, in calculation of the final fuel injection time period Tout(i) determining the amount of fuel to be actually injected into each cylinder, the basic fuel injection time period Timap is multiplied by the fuel pressure-dependent correction coefficient KPF. This makes it possible to properly correct the amount of fuel to be actually injected by each injector 4 according to the differential pressure $\Delta$PF between the fuel pressure PF and the cylinder pressure PCYL. As a result, it is possible to perform accurate control of the amount of fuel actually injected into each cylinder. Thus, it is possible to determine the fuel injection amount properly according to the desired air-fuel ratio, thereby enhancing the convergence of the feedback control of the air-fuel ratio A/F.

Figure 16:
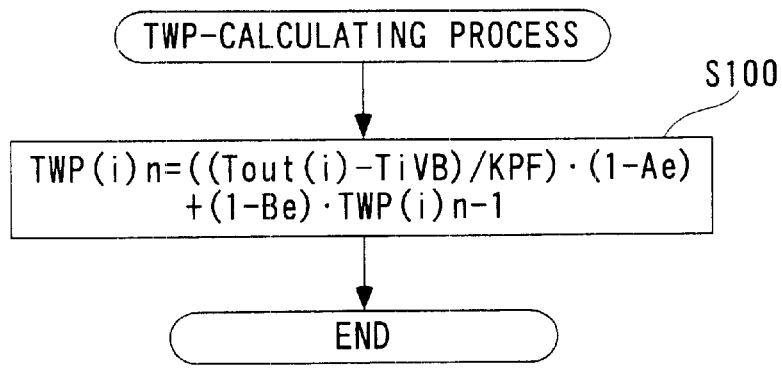
FIG. 16 is a flowchart of a TWP-calculating process.

Next, the TWP-calculating process for calculating the deposited-fuel amount-equivalent value TWP(i) used in the equation (1) will be described with reference to FIG. 16. This process is carried out in synchronism with input of the CRK signal on a cylinder-by-cylinder basis. In the process, at a step S100, the present value TWP(i)n of the deposited-fuel amount-equivalent value TWP(i) is calculated by the use of the following equation (2):

$$TWP(i)n=((Tout(i)-TiVB)/KPF) \cdot (1-Ae)+(1-B) \cdot TWP(i)n-1 \qquad (2)$$

wherein TWP(i)n−1 represents the immediately preceding value of the deposited-fuel amount-equivalent value TWP(i). Then, the value TWP(i)n is stored in the RAM, followed by terminating the TWP-calculating process.

Referring again to FIG. 2, after execution of the step S15, the program proceeds to a step S16, wherein the fuel injection timing $\theta$inj is calculated by a fuel injection timing process, followed by terminating the present routine. The fuel injection timing process will be described in detail hereinafter.

Figure 5:
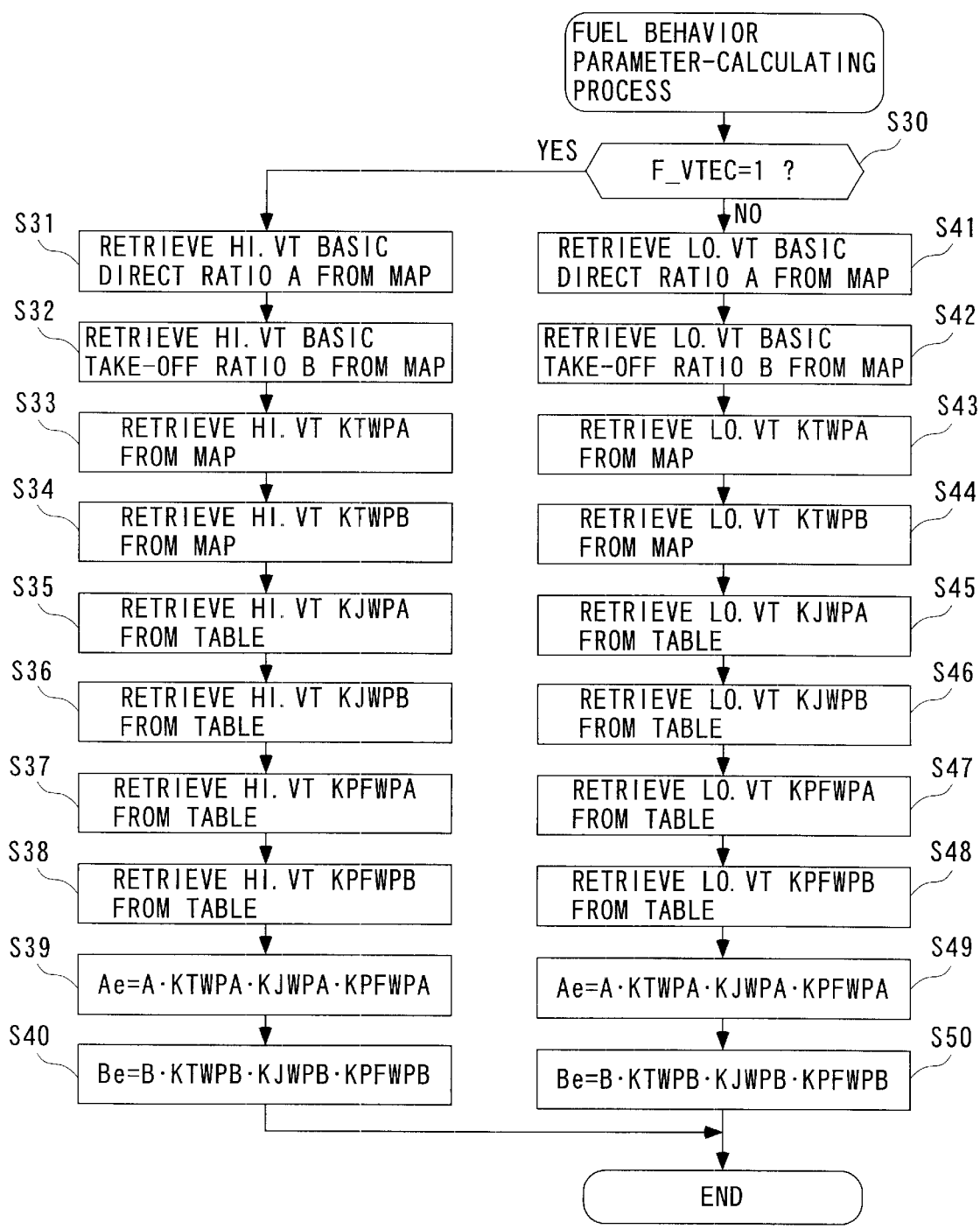
FIG. 5 is a flowchart showing a subroutine for carrying out a fuel behavior parameter-calculating process which is executed at a step S12 in FIG. 2.

Next, the fuel behavior parameter-calculating process executed at the step S12 will be described in detail with reference to FIG. 5. In this process, the direct ratio Ae and the carry-off ratio Be are calculated as mentioned below. The direct ratio Ae represents a ratio of the amount of part of injected fuel which is injected by the injector 4 in the present combustion cycle, the part of the injected fuel being actually burned in the present combustion cycle, to the whole amount of the injected fuel. On the other hand, the carry-off ratio Be represents a ratio of the amount of part of deposited fuel which was left deposited on the inner walls (cylinder surfaces, piston surfaces, etc.) of the combustion chamber 3c at an end of the immediately preceding combustion cycle, the part of the deposited fuel being actually burned in the present combustion cycle, to the whole amount of the deposited fuel.

More specifically, first, it is determined at a step S30 whether or not a flag F_VTEC assumes "1". The flag F_VTEC is set to "1" when the valve timing is held at HI.VT by the VTEC 8, whereas when the valve timing is held at LO.VT, the flag F_VTEC is set to "0".

Figure 6:
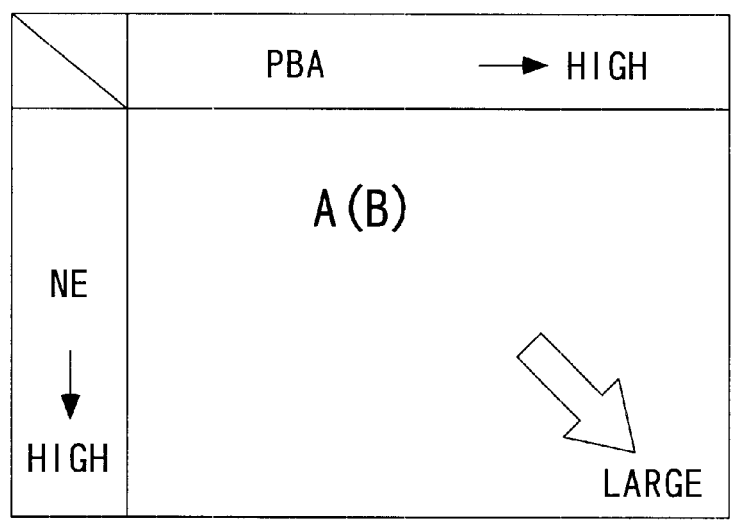
FIG. 6 shows a map for use in calculating a basic direct ratio A and a basic carry-off ratio B in the FIG. 5 process.

If the answer to the question of the step S30 is affirmative (YES), i.e. if the valve timing is held at HI.VT, the program proceeds to a step S31, wherein a basic direct ratio A for HI.VT is determined by retrieval from a map an example of which is shown in FIG. 6 according to the engine rotational speed NE and the intake air pipe absolute pressure PBA. In the map, the basic direct ratio A is set to a larger value as the engine rotational speed NE or the intake air pipe absolute pressure PBA is higher.

Then, the program proceeds to a step S32, wherein, similarly to the calculation of the basic direct ratio A at the step S31, a basic carry-off ratio B for HI.VT is determined by retrieval from a map similar to that shown in FIG. 6 according to the engine rotational speed NE and the intake air pipe absolute pressure PBA. In the map, the carry-off ratio B is set such that it changes with a similar tendency to that of the basic direct ratio A, but is set to each individual value different from a corresponding value of the basic direct ratio A.

Figure 7:
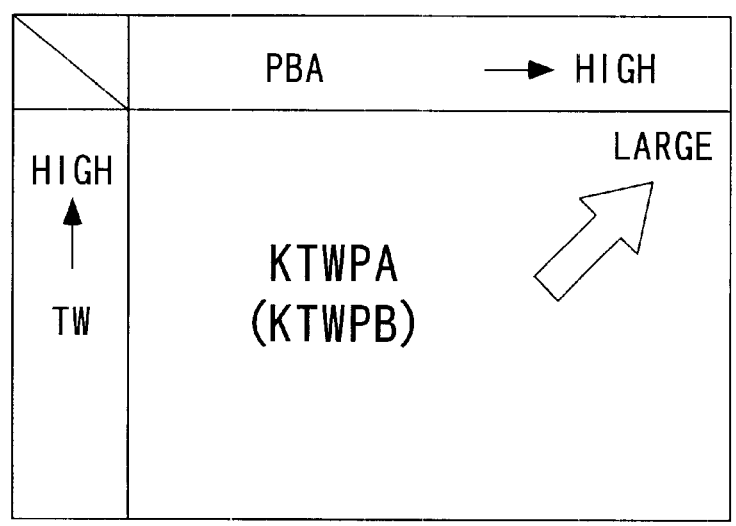
FIG. 7 shows a map for use in calculating coolant temperature-dependent correction coefficients KTWPA, KTWPB in the FIG. 5 process.

Then, the program proceeds to a step S33, wherein a coolant temperature-dependent correction coefficient KTWPA for use in correcting the basic direct ratio A for HI.VT is determined by retrieval from a map an example of which is shown in FIG. 7 according to the engine coolant temperature TW and the intake air pipe absolute pressure PBA. In the map, the coolant temperature-dependent correction coefficient KTWPA is set to a larger value as the engine coolant temperature TW or the intake air pipe absolute pressure PBA is higher.

Then, the program proceeds to a step S34, wherein, similarly to the coolant temperature-dependent correction coefficient KTWPA, a coolant temperature-dependent correction coefficient KTWPB for use in correcting the carry-off ratio B for HI.VT is determined by retrieval from a map similar to that shown in FIG. 7 according to the engine coolant temperature TW and the intake air pipe absolute pressure PBA. In the map, the coolant temperature-dependent correction coefficient KTWPB is set such that it changes with a similar tendency to that of the coolant temperature-dependent correction coefficient KTWPA, but is set to each individual value different from a corresponding value of the correction coefficient KTWPA.

Figure 8:
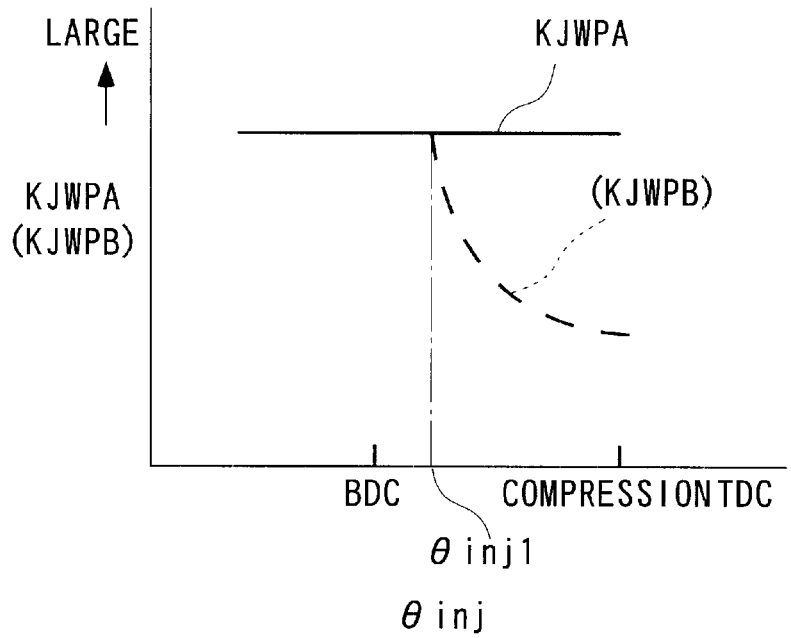
FIG. 8 shows an example of a table for use in calculating injection timing correction coefficients KJWPA, KJWPB in the FIG. 5 process.

Then, the program proceeds to a step S35, wherein an injection timing-dependent correction coefficient KJWPA for use in correcting the basic direct ratio A for HI.VT is determined by retrieval from a table an example of which is shown in FIG. 8 according to the immediately preceding value of the fuel injection timing θinj obtained at the step S16. As shown in this figure, in the table, the injection timing-dependent correction coefficient KJWPA is set to a constant value, irrespective of the fuel injection timing θinj.

Then, the program proceeds to a step S36, wherein, similarly to the calculation of the injection timing-dependent correction coefficient KJWPA, an injection timing-dependent correction coefficient KJWPB for use in correcting the carry-off ratio B for HI.VT is determined by retrieval from the FIG. 8 table according to the immediately preceding value of the fuel injection timing θinj obtained at the step S16. As shown in this figure, in this table, when the fuel injection timing θinj is on an advanced angle side with respect to a predetermined crank angle θinj1 between a BDC position in a second half of each intake stroke and a TDC position in each compression stroke, the injection timing-dependent correction coefficient KJWPB is set to a constant value, similarly to the injection timing-dependent correction coefficient KJWPA, whereas the injection timing-dependent correction coefficient KJWPB is set to a smaller value as the fuel injection timing θinj is more delayed with respect to the predetermined crank angle θinj1, i.e. as the fuel injection timing θinj is closer to the TDC position in each compression stroke. The reason why the injection timing-dependent correction coefficient KJWPB is thus set is that during the compression stroke of a piston, as the piston is closer to the TDC position, the cylinder pressure PCYL is increased, and hence it is difficult to vaporize fuel deposited on the inner walls of the combustion chamber 3c.

Figure 9:
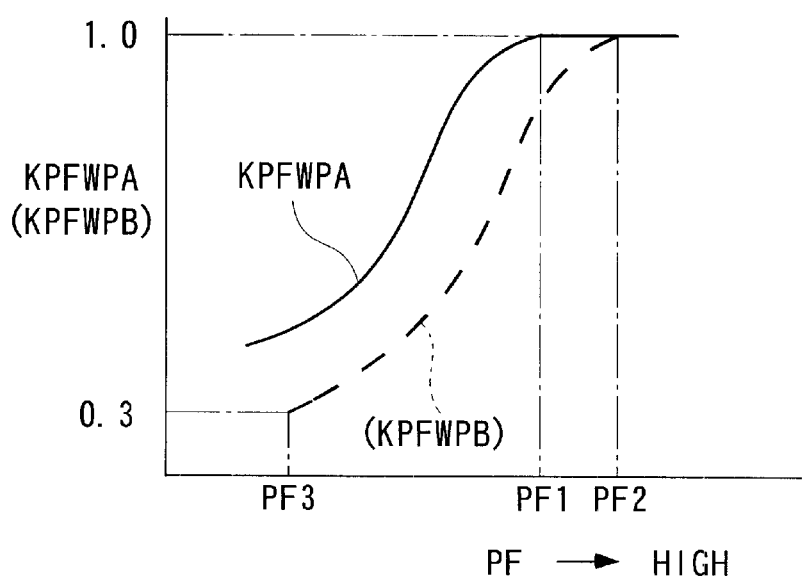
FIG. 9 shows an example of a table for use in calculating fuel pressure-dependent correction coefficients KPFWPA, KPFWPB in the FIG. 5 process.

Then, the program proceeds to a step S37, wherein a fuel pressure-dependent correction coefficient KPFWPA for use in correcting the basic direct ratio A for HI.VT is determined by retrieval from a table an example of which is shown in FIG. 9 according to the fuel pressure PF. As shown in the figure, in this table, when the fuel pressure is lower than a predetermined value PF1, the fuel pressure-dependent correction coefficient KPFWPA is set to a larger value as the fuel pressure PF is higher. The reason why the correction coefficient KPFWPA is thus set is that as the fuel pressure PF is lower, fuel is less readily atomized and hence more like to be deposited on the inner walls of the combustion chamber 3c, whereas as the fuel pressure PF is higher, fuel is more readily atomized and hence less likely to be deposited on the same. On the other hand, when the fuel pressure PF is equal to or higher than the predetermined value PF1, the correction coefficient KPFWPA is set to 1.0. This is because the rate of deposition of fuel on the inner walls of the combustion chamber 3c is substantially constant when the fuel pressure PF is equal to or higher than the predetermined value PF1.

Then, the program proceeds to a step S38, wherein, similarly to the calculation of the correction coefficient KPFWPA, a fuel pressure-dependent correction coefficient KPFWPB for use in correcting the basic carry-off ratio B for HI.VT is determined by retrieval from the FIG. 9 table according to the fuel pressure PF. As shown in the figure, in this table, when the fuel pressure is below a predetermined value PF2, the fuel pressure-dependent correction coefficient KPFWPB is set to a larger value as the fuel pressure PF is higher. The reason why the correction coefficient KPFWPB is thus set is that as the fuel pressure PF is higher, fuel deposited on the inner walls of the combustion chamber 3c is more readily removed therefrom and atomized. On the other hand, when the fuel pressure PF is equal to or higher than the predetermined value PF2, the correction coefficient KPFWPB is set to 1.0. This is because when the fuel pressure PF is equal to or higher than the predetermined value PF2, the ratio of the amount of part of deposited fuel deposited on the inner walls of the combustion chamber 3c, which part is actually burned in the present combustion cycle, to the whole amount of the deposited fuel, remains unchanged.

Then, the program proceeds to a step S39, wherein the direct ratio Ae is calculated by multiplying the basic direct ratio A obtained as above by the coolant temperature-dependent correction coefficient KTWPA, the injection timing-dependent correction coefficient KJWPA, and the fuel pressure-dependent correction coefficient KPFWPA. Then, the program proceeds to a step S40, wherein, similarly to the direct ratio Ae, the carry-off ratio Be is calculated by multiplying the basic carry-off ratio B by the coolant temperature-dependent correction coefficient KTWPB, the injection timing-dependent correction coefficient KJWPB, and the fuel pressure-dependent correction coefficient KPFWPB.

On the other hand, if the answer to the question of the step S30 is negative (NO), i.e. if the valve timing is held at LO.VT, a direct ratio Ae and a carry-off ratio Be for LO.VT are calculated by the following steps S41 to 50 similarly to the steps S31 to 40, followed by terminating the program. In this case, maps and tables used at the steps S41 to 48 are set such that they each exhibit similar tendency to a corresponding one of the maps and tables used for calculation of the direct ratio Ae and the carry-off ratio Be for HI.VT, but have different corresponding values.

As described above, the direct ratio Ae and the carry-off ratio Be are obtained by correcting the basic direct ratio A and the basic carry-off ratio B, respectively, by the fuel pressure-dependent correction coefficients KPFWPA, KPFWPB determined based on the fuel pressure PF. Then, the deposited-fuel amount-equivalent value TWP corresponding to the amount of deposited fuel is calculated by the use of the corrected direct ratio Ae and carry-off ratio Be. Since the fuel pressure PF and the deposited-fuel amount-equivalent value TWP are closely related to each other as described hereinabove with reference to the FIG. 9 table, it is possible to properly calculate the deposited-fuel amount-equivalent value TWP on a cylinder-by-cylinder basis such that the deposited-fuel amount-equivalent value TWP reflects the fuel pressure PF, by employing the above method of calculating the direct ratio Ae and the carry-off ratio Be and using these ratios. Further, since the basic direct ratio A and the basic carry-off ratio B are calculated separately according to the valve timing (LO.VT or HI.VT), it is possible to calculate the deposited-fuel amount-equivalent value TWP more properly in response to changes in the amount of intake air and the fuel injection timing θinj caused by switching of the valve timing. Thus, the final fuel injection time period Tout i.e. fuel injection amount can be properly determined, which makes it possible to enhance the convergence of the feedback control of the air-fuel ratio A/F.

Figure 10:
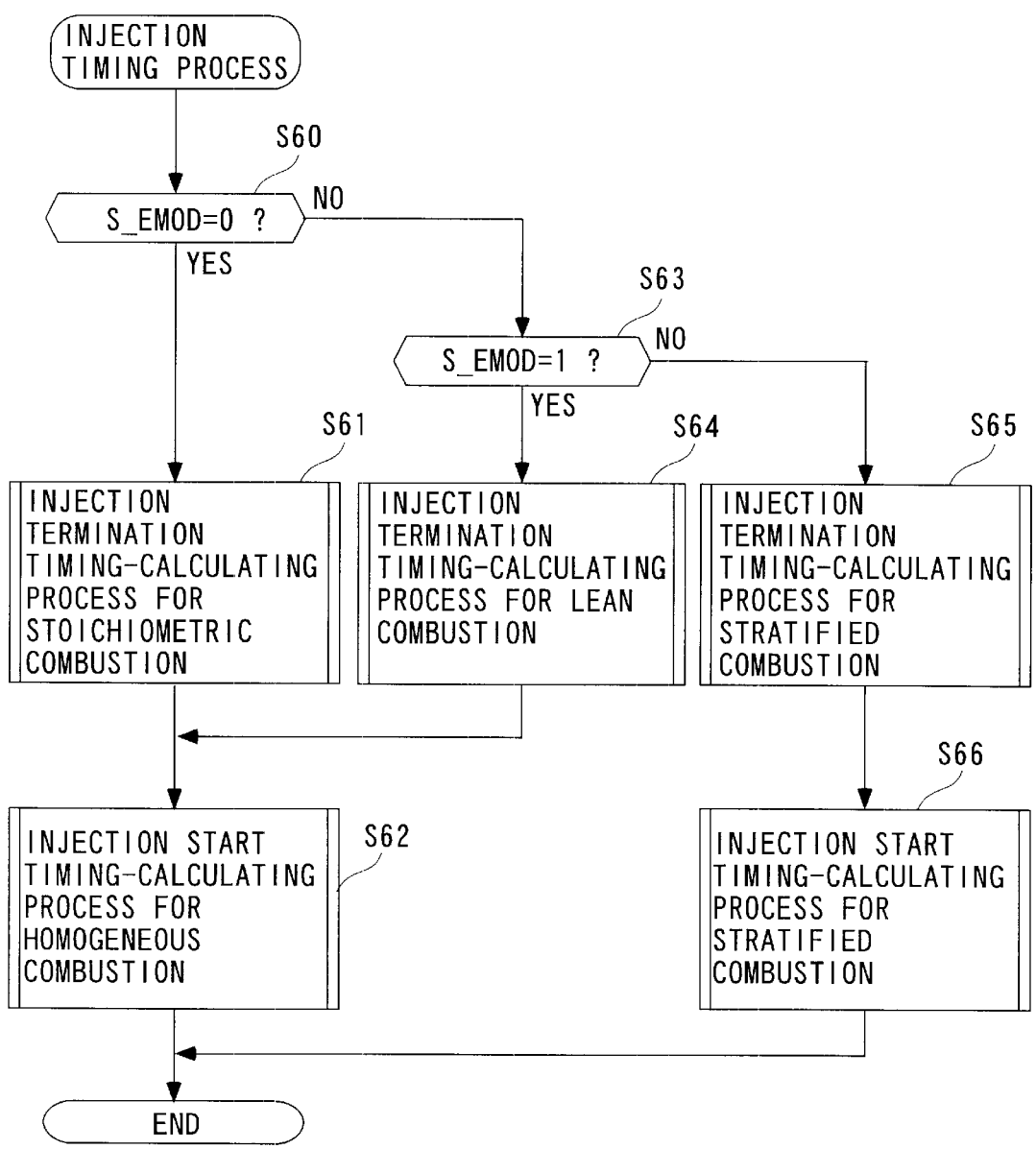
FIG. 10 is a flowchart showing a subroutine for carrying out an injection timing process which is executed at a step S16 in FIG. 2.
Figure 11:
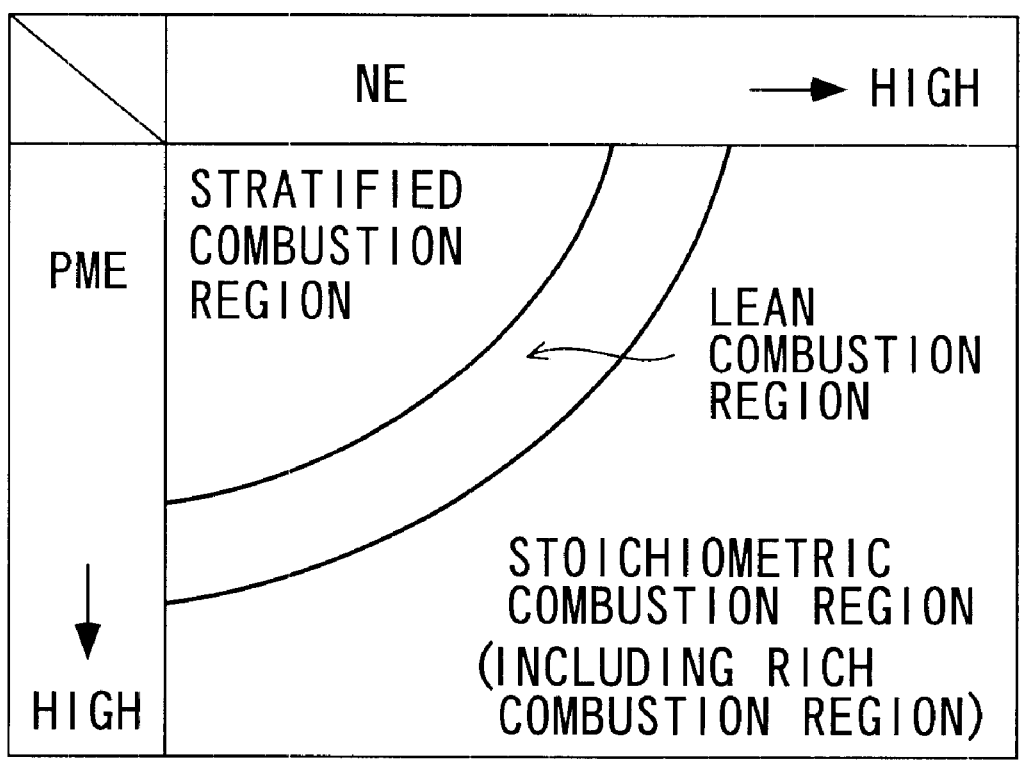
FIG. 11 shows a map for use in determining a value of a monitor S_EMOD in FIG. 10.

Next, the injection timing process executed at the step S16 will be described with reference to FIGS. 10 to 15. FIG. 10 shows a main routine for carrying out the injection timing process. As shown in the figure, in the process, first, it is determined at a step S60 whether or not a combustion mode monitor S_EMOD assumes "0".

The combustion mode monitor S_EMOD indicates which of the stratified combustion mode, and the lean combustion mode, the stoichiometric combustion mode, and the rich combustion mode included in the homogeneous combustion, the engine 3 is in. The value of the combustion mode monitor S_EMOD is set by retrieval from a map illustrated in FIG. 11 according to the required torque PME obtained at the step S5 and the engine rotational speed NE. More specifically, in the map, the value is set to "2" for a stratified combustion region, set to "1" for a lean combustion region, and set to "0" for a stoichiometric combustion region. The stoichiometric combustion region set in the map includes not only a region in which basically an air-fuel mixture having an air-fuel ratio equal to the stoichiometric air-fuel ratio is burned, but also a region in which an air-fuel mixture having an air-fuel ratio richer than the stoichiometric air-fuel ratio is burned. Therefore, "stoichiometric combustion" hereinafter includes rich combustion.

If the answer to the question of the step S60 is affirmative (YES), i.e. if S_EMOD=0 holds, which means that the engine 3 is being operated in the stoichiometric combustion mode, the program proceeds to a step S61, wherein an injection termination timing-calculating process for stoichiometric combustion is executed. In this process, which will be described in detail hereinafter, an injection termination timing IJLOGH of the fuel injection timing θinj for stoichiometric combustion is calculated.

Then, the program proceeds to a step S62, wherein an injection start timing-calculating process for homogeneous combustion is executed, followed by terminating the program. In this process, an injection start timing of the fuel injection timing θinj is calculated back from the injection termination timing IJLOGH obtained at the step S61 by using the final fuel injection time period Tout obtained at the step S15. The injection start timing and the injection termination timing IJLOGH are both calculated as respective crank angle positions with respect to the TDC position in each intake stroke.

On the other hand, if S_EMOD≠0 holds at the step S60, the program proceeds to a step S63, wherein it is determined whether or not the combustion mode monitor S_EMOD assumes "1". If the answer to the question is affirmative (YES), i.e. if S_EMOD=1 holds, which means that the engine 3 is being operated in the lean combustion mode, the program proceeds to a step S64, wherein an injection termination timing-calculating process for lean combustion, described in detail hereinafter, is executed to calculate an injection termination timing IJLOGH of the fuel injection timing θinj for lean combustion.

Then, the program proceeds to the step S62, wherein the injection start timing of the fuel injection timing θinj is calculated based on the injection termination timing IJLOGH obtained at the step S64 and the final fuel injection time period Tout, followed by terminating the program. At the steps S62, S64, similarly to the steps S61, S64, the injection start timing and the injection termination timing IJLOGH are both calculated as respective crank angle positions with respect to the TDC position in each intake stroke.

On the other hand, if the answer to the question of the step S63 is negative (NO), i.e. if S_EMOD=2 holds, which means that the engine 3 is being operated in the stratified combustion mode, the program proceeds to a step S65, wherein an injection termination timing-calculating process for stratified combustion is executed to calculate an injection termination timing IJLOGH of the fuel injection timing θinj for stratified combustion, similarly to the step S61, S64.

Then, the program proceeds to a step S66, wherein, similarly to the step S62, the injection start timing for stratified combustion is calculated based on the injection termination timing IJLOGH obtained at the step S65 and the final fuel injection time period Tout, followed by terminating the program. At the steps S65, S66, differently from the steps S61, S62, S64, the injection start timing and the injection termination timing IJLOGH are both calculated as respective crank angle positions with respect to the TDC position in each compression stroke.

Next, the injection termination timing-calculating process for stoichiometric combustion, which is executed at the step S61, will be described with reference to FIG. 12. In the process, as described below, the injection termination timing IJLOGH of the fuel injection timing θinj is calculated on a cylinder-by-cylinder basis, as a crank angle position after TDC (ATDC) of an intake stroke.

Figure 13:
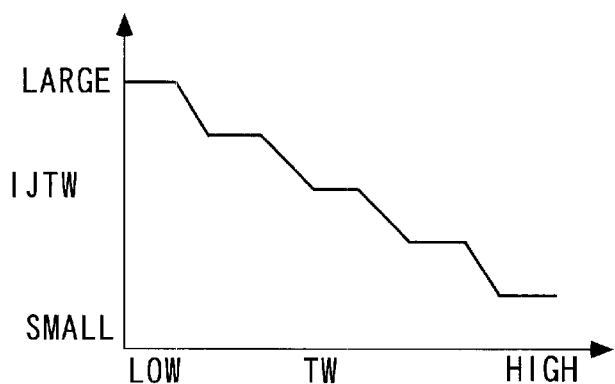
FIG. 13 shows an example of a table for use in calculating IJTW at a step S70 in FIG. 12 and at a step S80 in FIG. 14.

In the process, first, at a step S70, a coolant temperature-dependent correction term IJTW is determined. More specifically, the coolant temperature-dependent correction term IJTW is determined by retrieval from a TW-IJTW table an example of which is shown in FIG. 13, according to the engine coolant temperature TW. As shown in the figure, in the TW-IJTW table, the coolant temperature-dependent correction term IJTW is set to a smaller value as the engine coolant temperature TW is higher. The correction term IJTW is thus set so as to generate torque efficiently by advancing the injection termination timing IJLOGH of the fuel injection timing θinj since fuel injected into the combustion chamber 3c is easier to ignite as the engine coolant temperature TW is higher and hence homogeneous combustion is carried out more efficiently.

Figure 12:
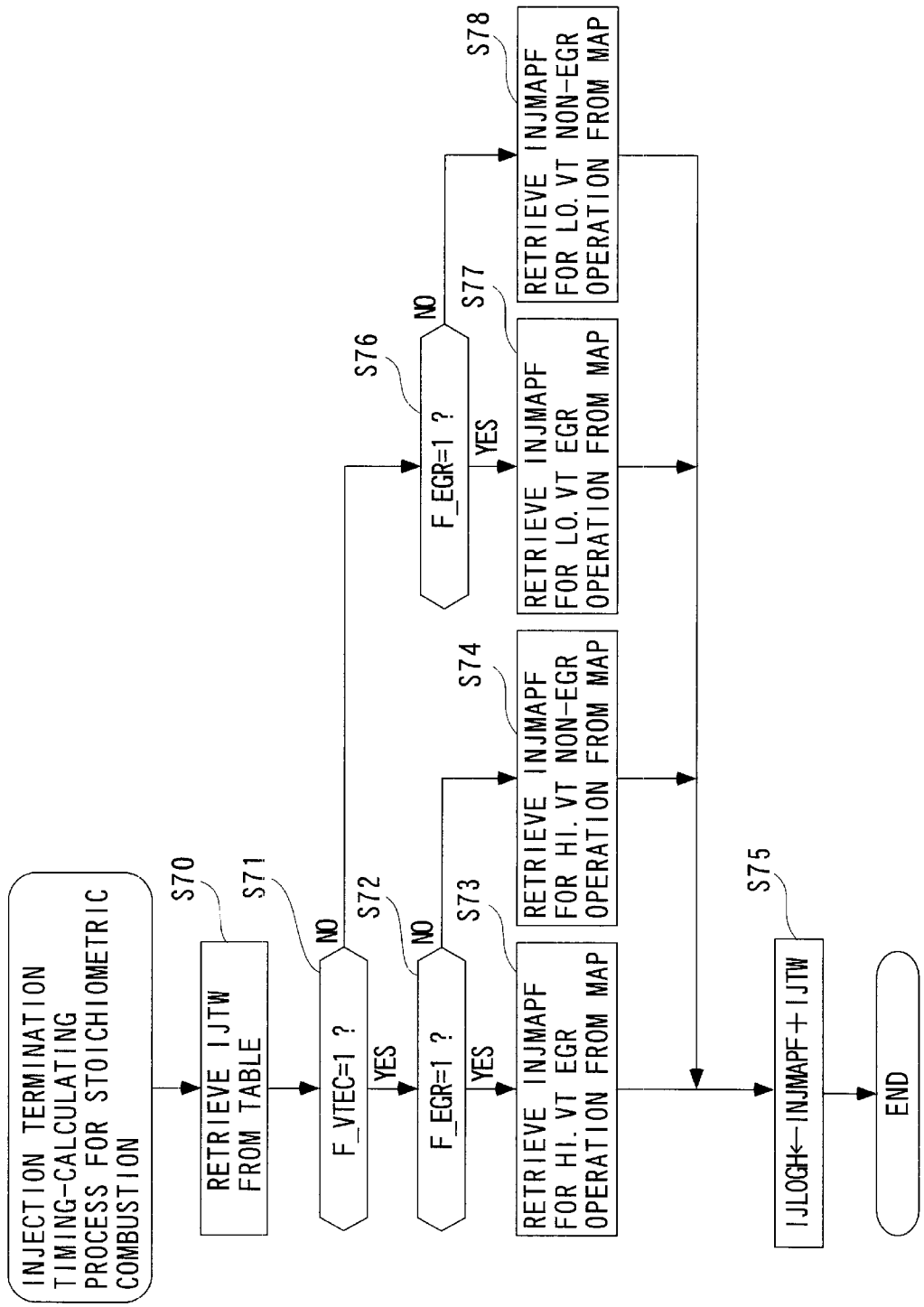
FIG. 12 is a flowchart showing a subroutine for carrying out an injection termination timing-calculating process for stoichiometric combustion in FIG. 10.

Then, at a step S71 in FIG. 12, it is determined whether or not the flag_F VTEC assumes "1". If the answer to the question is affirmative (YES), i.e. if the valve timing is held at HI.VT, the program proceeds to a step S72, wherein it is determined whether or not an EGR-permitting flag F_EGR assumes "1". The flag F_EGR is set to "1" when the EGR pipe 11 is opened by the EGR control valve 12 for execution of the EGR operation, whereas if the EGR pipe 11 is closed to inhibit the execution of EGR operation, the flag F_EGR is set to "0".

If the answer to the question of the step S72 is affirmative (YES), i.e. if the EGR operation is being executed, the program proceeds to a step S73, wherein a basic injection termination timing INJMAPF for HI.VT EGR operation is determined by retrieval from a map, not shown, according to the engine rotational speed NE and the final fuel injection time period Tout(i) obtained at the step S15 for each cylinder, on a cylinder-by-cylinder basis.

Then, the program proceeds to a step S75, and the injection termination timing IJLOGH is set to a value obtained by adding the coolant temperature-dependent correction term IJTW calculated at the step S70 to the basic injection termination timing INJMAPF for each cylinder, followed by terminating the program. Thus, the injection termination timing IJLOGH for HI.VT EGR operation is obtained for each cylinder.

On the other hand, if the answer to the question of the step S72 is negative (NO), i.e. if EGR operation is not being executed, the program proceeds to a step S74, wherein a basic injection termination timing INJMAPF for HI.VT NON-EGR operation is determined by retrieval from a map, not shown, similarly to the step S73, according to the engine rotational speed NE and the final fuel injection time period Tout (i) for each cylinder, on a cylinder-by-cylinder basis. Then, at the step S75, an injection termination timing IJLOGH for HI.VT NON-EGR operation is obtained for each cylinder, followed by terminating the program.

If the answer to the question of the step S71 is negative (NO), i.e. if the valve timing is held at LO.VT, the program proceeds to a step S76, wherein it is determined whether or not the EGR-permitting flag F_EGR assumes "1".

If the answer to this question is affirmative (YES), i.e. if EGR operation is being carried out, the program proceeds to a step S77, wherein similarly to the step S73, a basic injection termination timing INJMAPF for LO.VT EGR operation is retrieved from a map, not shown, according to the engine rotational speed NE and the final fuel injection time period Tout(i) for each cylinder, on a cylinderby-cylinder basis. Then, at the step S75, an injection termination timing IJLOGH for LO.VT EGR operation is obtained for each cylinder, followed by terminating the program.

On the other hand, if the answer to the question of the step S76 is negative (NO), i.e. if the EGR operation is not being carried out, the program proceeds to a step S78, wherein similarly to the step S73, a basic injection termination timing INJMAPF for LO.VT NON-EGR operation is determined by retrieval from a map, not shown, according to the engine rotational speed NE and the final fuel injection time period Tout(i) for each cylinder, on a cylinder-by-cylinder basis. Then, at the next step S75, an injection termination timing IJLOGH for LO.VT NON-EGR operation is calculated on a cylinder-by-cylinder basis, followed by terminating the present program.

Figure 14:
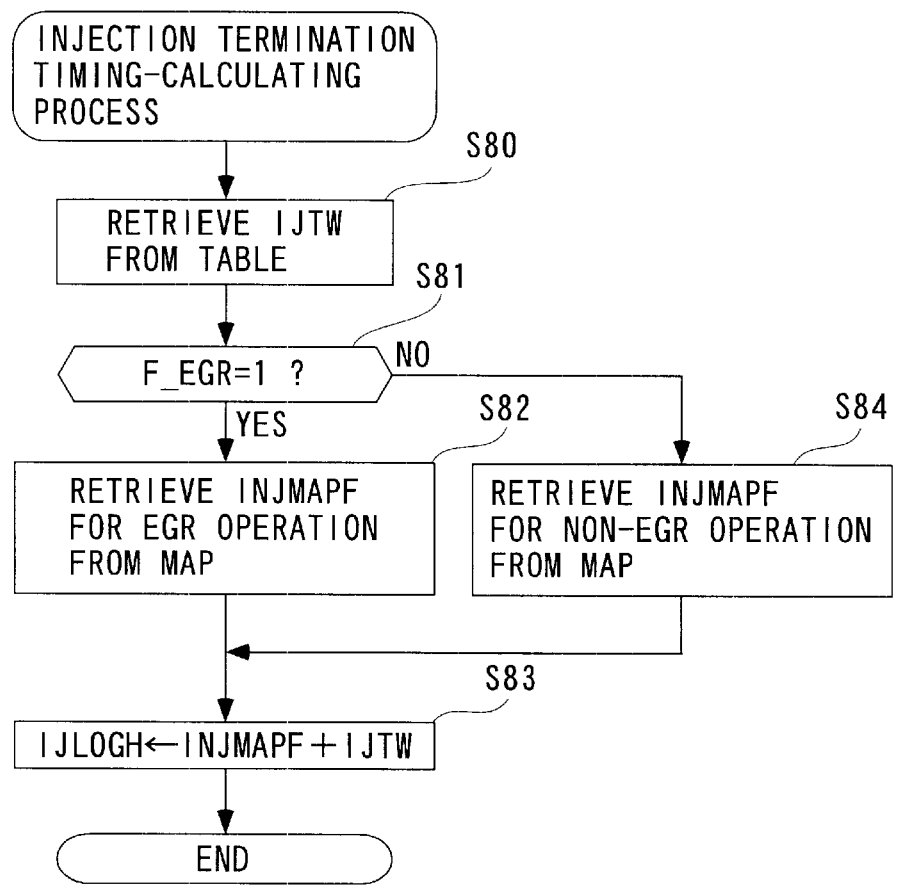
FIG. 14 is a flowchart showing a subroutine for carrying out an injection termination timing-calculating process for lean combustion in FIG. 10.

Next, the injection termination timing-calculating process for lean combustion, which is executed at the step S64, will be described with reference to FIG. 14. In this process, similarly to the injection termination timing for stoichiometric combustion, the injection termination timing IJLOGH is calculated as a crank angle position after TDC during an intake stroke of each piston.

In the process, first, at a step S80, similarly to the step S70, a coolant temperature-dependent correction term IJTW is determined by retrieval from the FIG. 13 TW-IJTW table according to the engine coolant temperature TW.

Then, the program proceeds to a step S81, wherein it is determined whether or not the EGR-permitting flag F_EGR assumes "1". If the answer to the question is affirmative (YES), i.e. if EGR operation is being carried out, the program proceeds to a step S82, wherein a basic injection termination timing INJMAPF for EGR operation is determined by retrieval from a map, not shown, according to the engine rotational speed NE and the final fuel injection time period Tout (i) for each cylinder, on a cylinder-by-cylinder basis.

Then, the program proceeds to a step S83, and the injection termination timing IJLOGH is set to a value obtained by adding the coolant temperature-dependent correction term IJTW calculated at the step S80 to the basic injection termination timing INJMAPF for each cylinder, followed by terminating the program. Thus, the injection termination timing IJLOGH for EGR operation is obtained for each cylinder.

On the other hand, if the answer to the question of the step S81 is negative (NO), i.e. if EGR operation is not being carried out, the program proceeds to a step S84, wherein a basic injection termination timing INJMAPF for NON-EGR operation is determined by retrieval from a map, not shown, similarly to the step S82, according to the engine rotational speed NE and the final fuel injection time period Tout (i) for each cylinder, on a cylinder-by-cylinder basis. Then, at the step S83, an injection termination timing IJLOGH for NON-EGR operation is obtained for each cylinder, followed by terminating the program.

Figure 15:
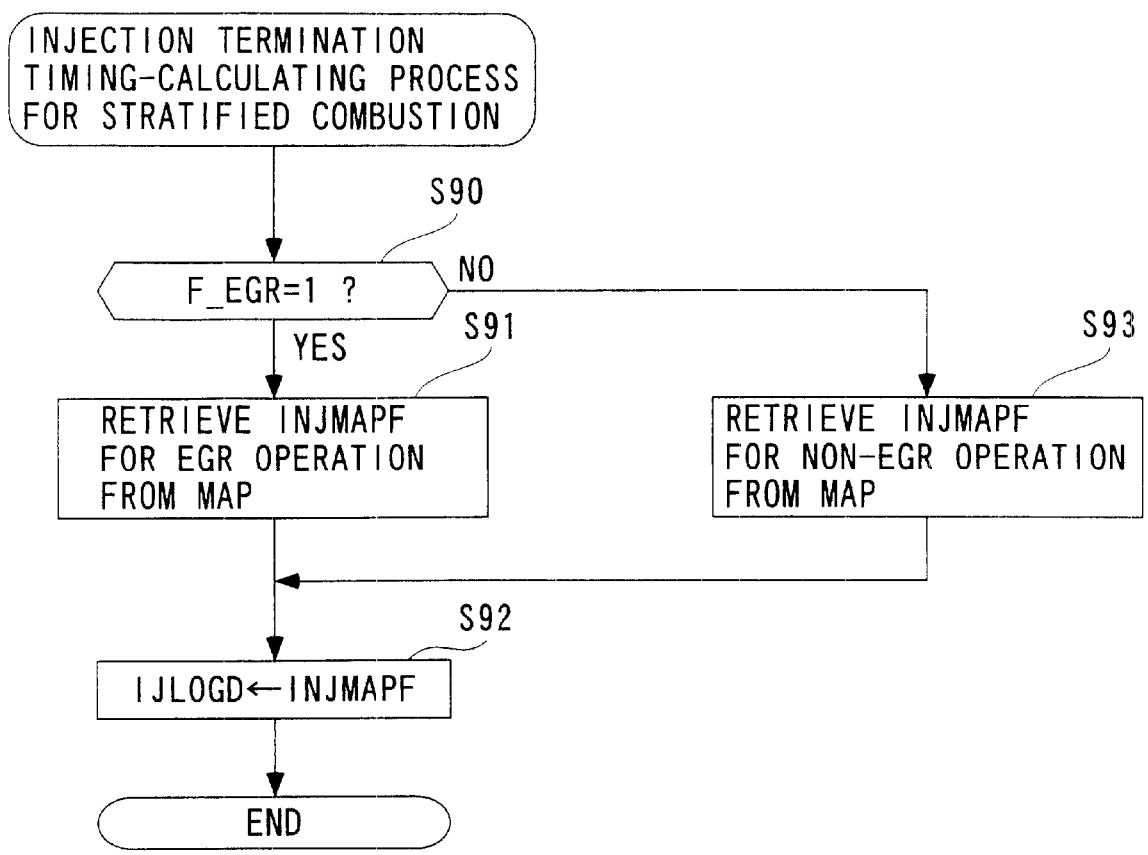
FIG. 15 is a flowchart showing a subroutine for carrying out an injection termination timing-calculating process for stratified combustion in FIG. 10.

Next, the injection termination timing-calculating process for stratified combustion, which is executed at the step S65, will be described with reference to FIG. 15. In the process, differently from the injection termination timing for stoichiometric combustion or for lean combustion, the injection termination timing IJLOGH is calculated as a crank angle position after TDC of a compression stroke of each piston.

In the process, first, it is determined at a step S90 whether or not the EGR-permitting flag F_EGR assumes "1". If the answer to the question is affirmative (YES), i.e. if EGR operation is being carried out, the program proceeds to a step S91, wherein a basic injection termination timing INJMAPF for EGR operation is determined by retrieval from a map, not shown, according to the engine rotational speed NE and the final fuel injection time period Tout (i) for each cylinder, on a cylinder-by-cylinder basis.

Then, the program proceeds to a step S92, wherein the injection termination timing IJLOGH is set to the basic injection termination timing INJMAPF for each cylinder, followed by terminating the program.

On the other hand, if the answer to the question of the step S90 is negative (NO), i.e. if EGR operation is not being carried out, the program proceeds to a step S93, wherein a basic injection termination timing INJMAPF for NON-EGR operation is determined by retrieval from a map, not shown, similarly to the step S91, according to the engine rotational speed NE and the final fuel injection time period Tout (i) for each cylinder, on a cylinder-by-cylinder basis. Then, at the step S92, an injection termination timing IJLOGH for NON-EGR operation is obtained for each cylinder, followed by terminating the program.

As described above, according to the fuel injection control system 1 of the present embodiment, in the calculation of the required fuel injection time period Tcyl(i) determining a required fuel amount based on the operating conditions of the engine 3, the fuel pressure correction coefficient KPF is not used. The required fuel injection time period Tcyl(i) by nature is irrelevant to the fuel pressure PF, so that the required fuel injection time period Tcyl(i) can be properly calculated by excluding the fuel pressure correction coefficient KPF from the calculating equation therefor. On the other hand, in the calculation of the final fuel injection time period Tout(i) determining the amount of fuel to be actually injected into each cylinder, the basic fuel injection time period Timap is multiplied by the fuel pressure correction coefficient KPF. This makes it possible to properly correct the amount of fuel to be actually injected by the injector 4 according to the differential pressure $\Delta$PF which is a difference between the fuel pressure PF and the cylinder pressure (pressure within the cylinder) PCYL. As a result, it is possible to perform accurate control of the amount of fuel actually injected into the cylinder. Thus, it is possible to properly determine the fuel injection amount according to the desired air-fuel ratio, thereby enhancing the convergence of the feedback control of the air-fuel ratio A/F.

Further, according to the fuel injection control system 1 of the present embodiment, the direct ratio Ae and the take-off ratio Be are determined by correcting the basic direct ratio A and the basic take-off ratio B, by the fuel pressure correction coefficients KPFWPA, KPFWPB calculated based on the fuel pressure PF, respectively. Then, the deposited-fuel amount-equivalent value TWP equivalent to the amount of deposited fuel is calculated by the use of the corrected direct ratio Ae and take-off ratio Be. Since the fuel pressure PF and the deposited-fuel amount-equivalent value TWP are closely related to each other as described hereinabove with reference to the FIG. 9 table, it is possible to properly calculate the deposited-fuel amount-equivalent value TWP on a cylinder-by-cylinder basis such that the deposited-fuel amount-equivalent value TWP reflects the fuel pressure PF, by employing the above method of calculating the direct ratio Ae and the carry-off ratio Be and using these ratios. Further, since the basic direct ratio A and the basic carry-off ratio B are calculated separately according to the valve timing (LO.VT or HI.VT), it is possible to calculate the deposited-fuel amount-equivalent value TWP more properly in response to changes in the amount of intake air and the fuel injection timing θinj caused by switching of the valve timing. Thus, the final fuel injection time period Tout i.e. fuel injection amount can be properly determined, which makes it possible to enhance the convergence of the feedback control of the air-fuel ratio A/F.

It is further understood by those skilled in the art that the foregoing is a preferred embodiment of the invention, and that various changes and modifications may be made without departing from the spirit and scope thereof.

What is claimed is:

1. A fuel injection control system for an internal combustion engine of an in-cylinder fuel injection type in which fuel is directly injected into a combustion chamber within a cylinder, the fuel injection control system controlling a fuel injection time period to thereby control an amount of fuel to be injected into said cylinder, the system comprising:
operating condition-detecting means for detecting operating conditions of said engine;
required fuel amount-determining means for determining a required fuel amount based the detected operating conditions;
deposited-fuel amount-determining means for determining a deposited-fuel amount of fuel which is deposited within said combustion chamber, based the detected operating conditions;
required fuel amount-correcting means for correcting said required fuel amount according to the determined deposited-fuel amount;
fuel pressure-detecting means for detecting a fuel pressure of fuel to be injected into said cylinder; and
fuel injection time period-determining means for determining said fuel injection time period as a time period equivalent to a value obtained by correcting the corrected required fuel amount according to the detected fuel pressure.

2. A fuel injection control system according to claim 1, further including fuel behavior parameter-calculating means for calculating fuel behavior parameters indicative of behaviors of fuel injected into said cylinder, based on the detected operating conditions, and fuel behavior parameter-correcting means for correcting said fuel behavior parameters according to said detected fuel pressure, and wherein said deposited-fuel amount-determining means determines said deposited-fuel amount based on said fuel behavior parameters corrected by said fuel behavior parameter-correcting means.

3. A fuel injection control system according to claim 2, wherein at least one of an intake valve and an exhaust valve of said internal combustion engine can be selectively switched to any one of a plurality of valve timings, and wherein said fuel behavior parameter-correcting means corrects said fuel behavior parameters according to the selected valve timing.

4. A fuel injection control system according to claim 2, wherein said operating condition-detecting means includes crank angle position-detecting means for detecting a crank angle position of said cylinder, and wherein said fuel injection amount-determining means includes differential pressure-calculating means for calculating a differential pressure between the detected fuel pressure and a pressure within said cylinder which is estimated from the detected crank angle position of said cylinder, said value being obtained by correcting the corrected required fuel amount according to the differential pressure.

5. A fuel injection control system according to claim 2, wherein said parameters indicative of behaviors of fuel are a ratio of an amount of part of injected fuel which is injected in the present combustion cycle, said part of said injected fuel being actually burned in the present combustion cycle, to an amount of said injected fuel, and a ratio of an amount of part of deposited fuel which was left deposited on inner walls of a combustion chamber defined within said cylinder at an end of the immediately preceding combustion cycle, said part of said deposited fuel being actually burned in the present combustion cycle, to an amount of said deposited fuel.

\* \* \* \* \*